United States Patent
Farhoodi et al.

(10) Patent No.: US 12,507,218 B2
(45) Date of Patent: Dec. 23, 2025

(54) CONTROL PLANE MESSAGE FOR SLOT INFORMATION CONVEYANCE

(71) Applicant: Dell Products L.P., Round Rock, TX (US)

(72) Inventors: Ahmad Farhoodi, Kanata (CA); Tommy Ivarsson, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 310 days.

(21) Appl. No.: 18/307,523

(22) Filed: Apr. 26, 2023

(65) Prior Publication Data
US 2024/0365292 A1   Oct. 31, 2024

(51) Int. Cl.
*H04W 72/0446* (2023.01)

(52) U.S. Cl.
CPC .............. *H04W 72/0446* (2013.01)

(58) Field of Classification Search
CPC ............ H04W 72/0446; H04W 72/23; H04L 5/0094; H04L 5/0007; H04L 27/367; H04L 67/131; H04L 5/0053
See application file for complete search history.

(56) References Cited

U.S. PATENT DOCUMENTS

| | | | |
|---|---|---|---|
| 2021/0126760 A1* | 4/2021 | Lee | H04B 7/0617 |
| 2022/0210808 A1* | 6/2022 | Rama Chandran | H04W 72/20 |
| 2024/0314606 A1* | 9/2024 | Wang | H04B 7/06952 |
| 2024/0334178 A1* | 10/2024 | Song | H04W 8/24 |

FOREIGN PATENT DOCUMENTS

| | | |
|---|---|---|
| KR | 2021 0043714 | 4/2021 |
| WO | 2020/080838 | 4/2020 |

(Continued)

OTHER PUBLICATIONS

ETSI TS 103 859 V7.0.2 O-Ran Fronthaul Control, User and Synchronization Plane Specification v07.02, Sep. 2022 (Year: 2022).*

(Continued)

*Primary Examiner* — Andrew W Chriss
(74) *Attorney, Agent, or Firm* — Amin, Turocy & Watson, LLP

(57) ABSTRACT

The described technology is directed towards conveying, from a distributed unit to a radio unit, orthogonal frequency division multiplexing (OFDM) symbol-related data for each symbol of a slot for downlink transmissions by the radio unit. The symbol-related data includes information about each OFDM symbol's power, and the highest order of modulation used per symbol. The conveyed data can indicate a totally blank OFDM symbol. The per-slot symbol-related data can be conveyed in a control plane message to the radio unit, which, in an Open-Radio Access Network (O-RAN) network, can be formatted as a control plane section message type. Based on the slot information, a radio unit can configure the radio unit's power amplifiers, perform crest factor reduction, and/or digital pre-distortion tuning according to dynamic changes in the incoming downlink traffic, which can result in significant reduction in the power amplifiers' power consumption to boost the radio unit's overall energy efficiency.

20 Claims, 10 Drawing Sheets

(56) References Cited

FOREIGN PATENT DOCUMENTS

WO         2022/046980     3/2022
WO         WO-2022046980 A2 *   3/2022            H04L 5/0048

OTHER PUBLICATIONS

Lagen et al (Modulation Compression in Next Generation RAN: Air Interface and Fronthaul trade-offs). (Year: 2020).*
International Search Report and Written Opinion for PCT Application No. PCT/US2023/036174 mailed Mar. 6, 2024, 21 pages.
O-RAN Fronthaul Working Group 4:"Control, User and Synchronization Plane Specification", Internet Citation, Aug. 2, 2019 (Aug. 2, 2019), pp. 1-218, XP009527536, Retrieved from the Internet: URL:https://www.o-ran.org/specification-ac cess section 6.3; p. 101-p. 105.
Notification Concerning Transmittal of International Preliminary Report on Patentability dated Nov. 6, 2025 for International application No. PCT/US2023/036174.

* cited by examiner

| Section Type | Target Scenario | Remarks |
|---|---|---|
| 0 | Unused Resource Blocks or symbols in Downlink or Uplink | Indicates to the O-RU that certain Resource Blocks or symbols will not be used (idle periods, guard periods). Likewise, there are no associated U-Plane messages containing IQ data for this Section Type. The purpose is to inform the O-RU that transmissions may be halted during the specified idle interval for e.g. power-savings or to provide an interval for calibration. |
| 1 | Most DL/UL radio channels (or alternative used by O-DU for PRACH signaling | "most" refers to channels not requiring time or frequency such as are needed for mixed-numerology channels - NOTE: When PRACH having same numerology as other UL channel, Section Type I can alternatively be used by O-DU for PRACH signaling. In this case, O-RU is not expected to perform any PRACH specific processing |
| 2 | Reserved for future use | |
| 3 | PRACH and mixed-numerology channels | Channels requiring time or frequency offsets or different-than-nominal SCS values |
| 4 | Slot Configuration Control | Slot configuration for multiple eAxC_IDs with one or multiple Section Type 4 configuration commands |
| 5 | UE scheduling information (ueId assignment to section) | Provides scheduling information for ueIds |
| 6 | Channel information | Sends UE-specific channel information from the O-DU to the O-RU |
| 7 | LAA | Messages communicated between O-DU and the O-RU in both directions to configure LBT for PDSCH/ DRS transmission and to report the LBT outcome |
| 8 | ACK/NACK Feedback | Sent from the O-RU to the O-DU, providing ACK/ NACK feedback for section descriptions in C-Plane messages |
| Any of 9 - 255 | Slot Information Conveyance | Message carries information about each OFDM symbol in a particular slot |

| Highest Order of Modulation (per symbol) | Bit representation ($b_4b_3b_2b_1$) |
|---|---|
| Not used | 0000 |
| π/2-BPSK | 0001 |
| BPSK | 0010 |
| QPSK | 0011 |
| 16 QAM | 0100 |
| 64QAM | 0101 |
| 256QAM | 0110 |
| 1024QAM | 0111 |
| Reserved (for future additions) | 1000 - 1111 | symModOrder (symbol highest modulation order identifier) field

| OFDM Symbol Power (dBFS) | Bit representation ($b_7b_6b_5b_4b_3b_2b_1$) |
|---|---|
| 0.0 | 1111111 |
| -0.5 | 1111110 |
| -1.0 | 1111101 |
| -1.5 | 1111100 |
| ⋮ | ⋮ |
| -62.5 | 0000010 |
| -63.0 | 0000001 |
| -63.5 | 0000000 | symbolPower (total OFDM symbol power identifier) field

FIG. 5

CONTROL PLANE MESSAGE FOR SLOT INFORMATION CONVEYANCE

BACKGROUND

In wireless network communications, Open-Radio Access Network (O-RAN) provides for separate centralized units, distributed units and radio units. In general, a distributed unit is responsible for physical resource block scheduling and symbol power allocations for each orthogonal frequency division multiplexing (OFDM) symbol for every scheduling slot. A radio unit operates according to such scheduling information received from a distributed unit.

Certain other symbol-related information, which can be useful to a radio unit, is not readily available to the radio unit. While possible in theory for a radio unit to extract some useful symbol-related information from actual received in-phase and quadrature (IQ) data, a typical radio unit may not have sufficient processing capability, nor time, to do so, as these are non-trivial determinations.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 2 is a representation of control plane section types including an example control plane section type for conveying slot information to radio units, in accordance with various aspects and implementations of the subject disclosure.

FIG. 4 is a table of example data for insertion into a field that represents a highest modulation order identifier for each symbol, in accordance with various aspects and implementations of the subject disclosure.

FIG. 5 is a table of example data for insertion into a field that represents symbol power data for each symbol, in accordance with various aspects and implementations of the subject disclosure.

DETAILED DESCRIPTION

Figure 1:
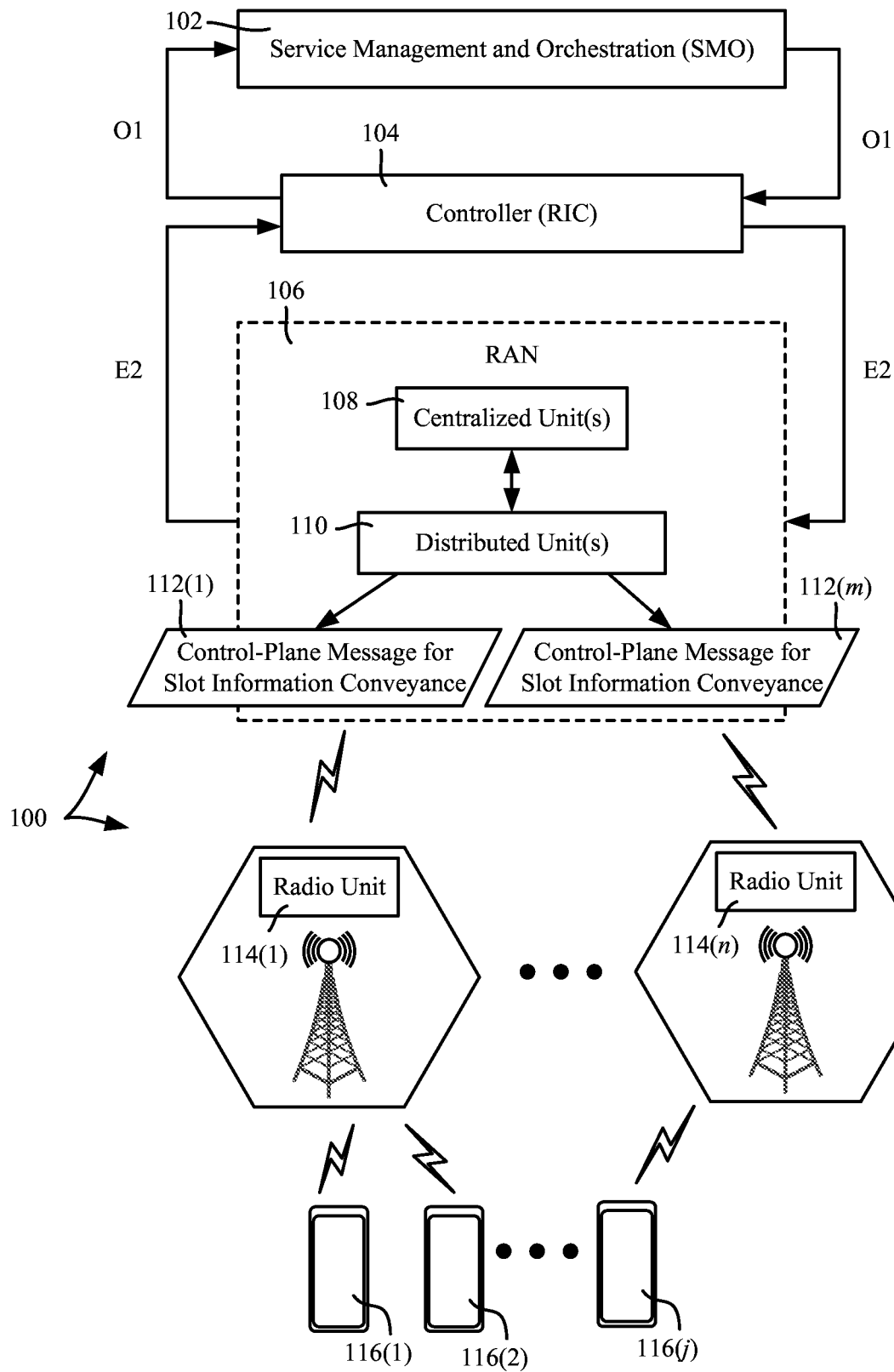
FIG. 1 is a block diagram of an example system/open-radio access network (O-RAN) architecture including distributed units that convey slot information to radio units via control plane messages, in accordance with various aspects and implementations of the subject disclosure.

The technology described herein is generally directed towards conveying symbol-related information from a distributed unit to a radio unit, including, for each symbol, order of modulation data and symbol power data. The symbol-related information for a group of symbols can be sent on a per-slot basis, via a control plane message for each slot. Sending this information to a radio unit ahead of the actual reception of the in-phase and quadrature (IQ) data (via the user plane), enables the radio unit, for example, to deploy and support a number of energy saving use cases which are not otherwise feasible to implement in the radio unit.

In one implementation, the control plane message is a section type message in an Open-Radio Access Network (O-RAN) architecture, according to a section type message format as defined in the O-RAN standards. Thus, in this implementation an O-RAN distributed unit (O-DU) sends the control plane message to an O-RAN Radio Unit (O-RU) in an O-RAN network.

It should be understood that any of the examples herein are non-limiting. As one example, the technology is generally described herein in an O-RAN (open radio access network) environment using a control plane section type message, however this is only an example, and the technology can be implemented in similar environments, and/or via other messages. Indeed, the technology is generally described can operate in accordance with any 5G, next generation communication technology, or existing communication technologies. Thus, any of the embodiments, aspects, concepts, structures, functionalities or examples described herein are non-limiting, and the technology may be used in various ways that provide benefits and advantages in data storage and computing in general. It also should be noted that terms used herein, such as "maximize" "optimize" or "optimal" and the like only represent objectives to move towards a more maximal or optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

One or more embodiments subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100 including a service management and orchestration (SMO) component 102 that handles the orchestration, management, and automation aspects of RAN (radio access network) elements. In one example implementation depicted in FIG. 1, in which the system is O-RAN compatible, a controller 104 (e.g., a RAN intelligent controller (RIC)) is coupled via the O1 interface to the service management and orchestration (SMO) component 102. The controller 104 is coupled via the E2 interface to RAN components (collectively 106), including centralized unit(s) 108 and distributed unit(s) 110.

As shown in FIG. 1, among other messages and data, the distributed unit(s) 110 transmit slot information (blocks 112(1)-112(m)) to radio units 114(1)-114(n), (which also can be considered network elements of the RAN 106). The radio units are shown as communicating with user equipment (UE) devices 116(1)-116(j). The non-limiting term "user equipment" or "UE" can refer to any type of device that can communicate, via the radio units 114(1)-114(n), with network nodes (the RAN elements 106) in the cellular or mobile communication system/architecture 100. Non-limiting examples of UE devices 116(1)-116(j), include target devices, device-to-device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. One or more of the UE devices 116(1)-116(j) can also comprise IOT devices that communicate wirelessly.

In one implementation, the slot information (blocks 112(1)-112(m) of FIG. 1) are sent via control plane messages, such as a section type message formatted according to the O-RAN control user synchronization (CUS) plane specifications. As of version 11.0 of the specifications, section types 0-8 are already defined (e.g., as shown in table 220 of FIG. 2), and thus as also shown in FIG. 2, a new section type message (dashed block 222) can be defined as any of (available) section types 9-255. As described herein, the section type slot information message 222 is used to convey slot information, including symbol-related information, to the radio units, e.g., for every slot.

As will be understood, this slot information message 222 can be sent every slot for downlink direction and contains information about each OFDM symbol's power, whether an OFDM symbol is totally blank, and also the highest order of modulation used per symbol. Note that instead of or in addition to a section type message, other messages, including proprietary messages can convey similar information, and thus the slot information conveyance technology described herein is not limited to any type of message, nor to O-RAN standards, nor to the example formats and information described herein. Indeed, regardless of the message format, it will be seen that the example message is extensible as well as including fields reserved for future use.

The slot information message can be sent every slot for downlink direction and contains information about each orthogonal frequency division multiplexing (OFDM) symbol's power, whether an OFDM symbol is totally blank, and also the highest order of modulation used per symbol. The information is beneficial to the radio unit's operation. One such example use case available via the slot information is employing dynamic biasing techniques to optimally bias the radio unit's power amplifiers according to the dynamic changes in the incoming downlink traffic. This adaptive power amplifier biasing (versus the traditional fixed basing of the power amplifiers) can result in significant reduction in the power amplifiers' power consumption and hence boost the overall radio unit energy efficiency. More particularly, because the slot information messages are sent ahead of the user plane IQ data, a radio unit can benefit from this extra time margin to execute proper PA bias adjustments before the actual downlink data received in the power amplifiers. It should be noted, however, that if for some reason a slot information message cannot be sent/properly received for any given slot, the radio unit can default to the traditional fixed basing for its power amplifiers for that given slot, until the next slot information message is properly received at the radio unit. Other use cases, e.g., traffic optimization, may be employed.

Note that at present, this information is not otherwise readily available at the radio unit. While possibly a radio can attempt to extract such information by looking into actual received IQ data and employ extra processing to determine the power and order of modulation and blank status of each symbol, doing so is not trivial and at present not easily achievable. Indeed, having the radio unit do so would add extra processing, extra processing delay and consume overall radio unit processing time margins, which may not be feasible due to insufficient time to send the data over the air on time, as there is a limited time margin available to the radio unit between reception of the IQ data and when it has to be sent over the air by the radio unit. The technology described herein avoids the extra cost and higher power consumption that would result from such additional radio unit processing logic at the radio unit.

Figure 3:
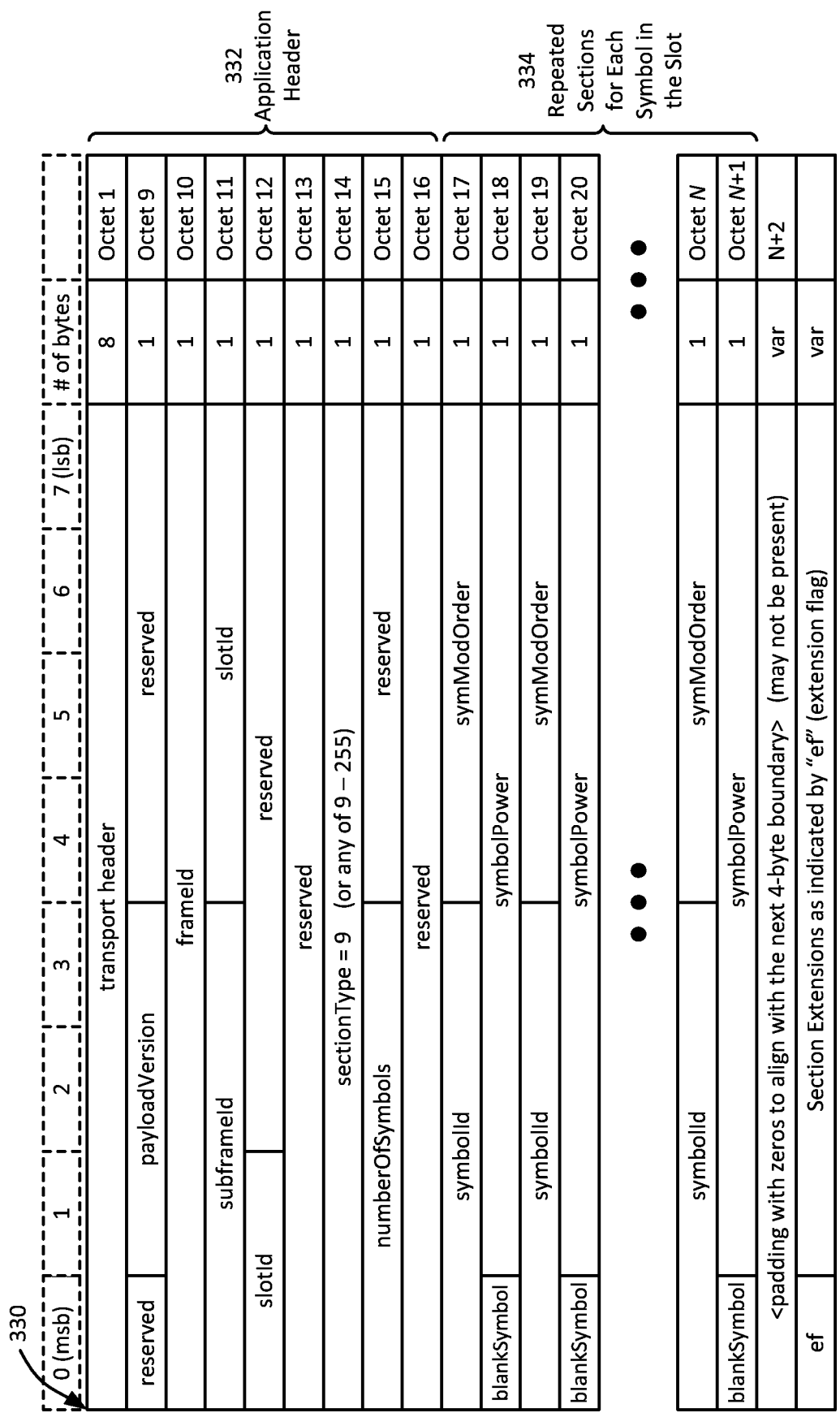
FIG. 3 is a representation of an example control plane section type message data structure for conveying slot information to radio units, in accordance with various aspects and implementations of the subject disclosure.

FIG. 3 shows an example data structure corresponding to an O-RAN control plane section message 330 for conveying the symbol-related data on a slot-by-slot basis from a distributed unit to a radio unit; (note that if the distributed unit has advance information for more than one slot, it may be feasible to batch the slot information into a similar message for multiple slots). In this example of encapsulating the various data into a section message 330, the transport header follows the same structure and content similar to the previously assigned Section Types 0-8 for backward compatibility. As shown in the upper portion (Octets 1 through 16) of the example message 330 of FIG. 3, the application header 332 fields and bit width assignments are as follows:

reserved (reserved for future use) field: 1 bit.
    payloadVersion (payload version) field: 3 bits:
        value=1 shall be set (1st protocol version for payload and time reference format).
    reserved (reserved for future use) field: 4 bits.
    frameId (frame identifier) field: 8 bits.
    subframeId (subframe identifier) field: 4 bits.
    slotId (slot identifier) field: 6 bits.
    reserved (reserved for future use) field: 14 bits.
    sectionType (Section Type) field: 8 bits.

value=9 can be set, for example, (or any of 9-255 if/as added to the standard).

numberOfSymbols (number of symbol identifier) field: 4 bits.

reserved (reserved for future use) field: 12 bits.

As shown in the mostly lower portion (Octets 17 through N+1) of the example message 330 of FIG. 3, section fields 334, repeated for each symbol in the slot, and their bit width assignments are as follows:

symbolId (symbolId identifier) field: 4 bits.

symModOrder (symbol highest modulation order identifier) field: 4 bits.

blankSymbol (blank symbol indicator) field: 1 bit.

symbolPower (total OFDM symbol power identifier) field: 7 bits.

Note that this information is available at the distributed unit, which in general is the entity responsible for PRB scheduling and symbol power allocations for each slot. As set forth herein, the radio unit would not otherwise have access to this information before the user plane IQ data is received, and regardless, may not likely have time or resources to extract such information from the IQ data.

Thus, in general and as described herein, via the section fields 334 repeated for each symbol in the slot, the message 330 carries information about every OFDM symbol in that particular slot. This information is highly useful to a radio unit, such as for configuring its power amplifiers for that slot. As shown in FIG. 3, the information content of this example message, per symbol, includes total OFDM symbol power, which conveys aggregated symbol power across the symbol's physical resource blocks (PRBs). The conveyed data further includes a highest modulation order, which indicates the highest order of modulation used among all the PRBs, and a blank symbol indicator (flag), which indicates a totally blank symbol. A radio unit's decoding logic need not process anything further (can ignore) such a blank symbol when the flag is set, which improves the radio unit's processing efficiency. Indeed, when the blank symbol indicator indicates a blank symbol, the highest modulation order and total OFDM symbol power are irrelevant (although with a blank symbol, the bit(s) of these other fields theoretically could be used to convey some other information).

The blank symbol indicator flag can be used to enable symbol-based power saving techniques in which power amplifiers along with some other portion of the downlink processing chains (e.g., data converters, filter banks, inverse fast fourier transforms, numerically controlled oscillator, and the like) can be shut down or put in power down mode for the duration of the blank symbol. This flag allows the radio unit to save power by not transmitting any signal over the air when the downlink symbol has no PRB allocation (all the PRBs are blank) on a symbol-based granularity which enhances the overall radio unit energy efficiency.

The modulation order information per symbol enables more optimum tuning and operation of the Crest Factor Reduction (CFR) algorithm in the radio unit by selecting the proper signal clipping thresholds based on the signal's highest modulation order which, in turn boosts the efficiency of the power amplifiers.

The modulation order information along with the symbol power levels can also be used to get a better linearization performance out of the Digital Pre-Distortion (DPD) algorithms by more optimally tuning the operation of the DPD for the best trade-off between the efficiency and linearity of the power amplifiers while achieving the out-of-band emissions requirements for the radio transmitter both in terms of ACLR (adjacent channel leakage ratio) and operating band unwanted emissions (OBUE).

Additional details of the example application header and section fields are further described hereinbelow for one example message implementation:

numberOfSymbols (number of symbol identifier) field: indicates the number of symbols contained in the slot configuration:
Field length: 4 bits
Type: unsigned integer
Value range:
for normal cyclic prefix, value=14 (1110b) is set
for extended cyclic prefix, value=12 (1100b) is set symbolId (symbolId identifier) field: indicates the symbol number within a slot
Field length: 4 bits
Type: unsigned integer
Value range: {0000b-1101b} blankSymbol (blank symbol indicator) field: indicates if a symbol is fully blank or not
Field length: 1 bit
Type: unsigned integer
Value range:
for totally blank symbol (no PRB assignment), value=1 is set
for not totally blank symbol (at least one PRB assignment), value=0 is set symModOrder (symbol highest modulation order identifier) field: conveys the highest order of modulation used among the allocated PRBs within a symbol
Field length: 4 bits
Type: unsigned integer
Value range: {0001b-1111b}
Bit assignment: according to the example table 440 of FIG. 4, in which "BPSK" represents binary phase-shift keying, "QPSK" represents quadrature phase-shift keying, and "QAM" represents quadrature amplitude modulation.

symbolPower (total OFDM symbol power identifier) field:
Field length: 7 bits
Type: unsigned integer
Value range: {0000000b-1111111b}
Bit assignment: according to the example bit assignments for the symbol power data field shown in the table 550 of FIG. 5, in which dBFS represents decibels full scale.

Note that when the OFDM symbol has zero power, the blank symbol indicator bit=1 is used; also note that 0 dBFS represents the maximum power level of an OFDM symbol.

With respect to the symbol power data, assuming the overall dynamic range for symbol power is around approximately 64 dB (or 63.5 dB, with respect to dBFS, as detailed below), with seven bits used for different power levels representation, 0.5 dB power level resolution is achieved, 127 decimal (1111111 binary) through 0 decimal (0000000 binary) is the range corresponding to 0.0 dBFS through −63.5 dBFS. Note that any and all of the above fields, types, ranges, and/or bit assignments are only practical examples.

The smallest power level of a resource element (RE) can be determined. More particularly, different downlink channels have different power levels and boost factors with respect to SSB/PBCH block (Synchronization Signal Block/ Physical Broadcast Channel) EPRE (energy per resource element):

NZP (non-zero-power) CSI-RS (channel state information reference signal) EPRE (energy per resource element) to SSB/PBCH block EPRE: max 6 dB PDSCH (physical downlink shared channel) EPRE to NZP CSI-RS EPRE: max 15 dB DM-RS (demodulation reference signalEPRE to PDSCH EPRE: max 4.77 dB QAM Modulation PAPR (peak to average power ratio): max 4.8 dB Precoding PAPR (for 16 layers): 12.04 dB Array carrier boost (for 16 eAxCs (extended antenna-carriers)): 12.04 dB Headroom for future enhancement (higher number of layers and/or carriers): 9 dB Overall margin for boost (dynamic range)=6+15+4.77+ 4.8+12.04+12.04+9=63.65 dB.

Returning to FIG. 3, following the last symbol power octet (N+1), padding with zeros to align octet N+2 with the next four-byte boundary may be needed (or not) based on the radio unit Boolean flag "st6-4 byte-alignment-required" value setting. Also, as indicated by the "ef" (extension flag) following octet N+2, the data structure is extensible to append more information, e.g., for future developments and the like.

Figure 6:
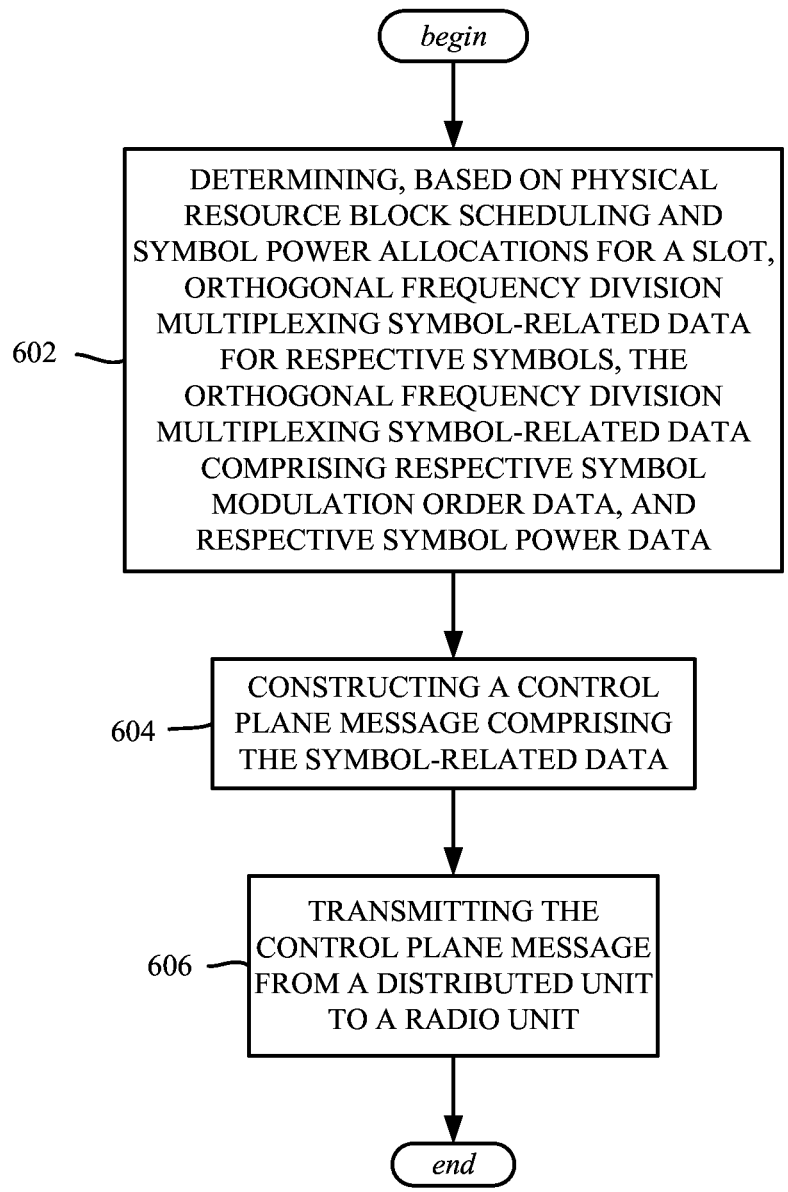
FIG. 6 is a flow diagram of example operations directed towards conveying orthogonal frequency division multiplexing symbol-related data and symbol power data for a symbol via a control plane message, in accordance with various aspects and implementations of the subject disclosure.

One or more aspects can be embodied in network equipment and/or a system, such as represented in the example operations of FIG. 6, and for example can include a memory that stores computer executable components and/or operations, and a processor that executes computer executable components and/or operations stored in the memory. Example operations can include operation 602, which represents determining, based on physical resource block scheduling and symbol power allocations for a slot, orthogonal frequency division multiplexing symbol-related data for respective symbols, the orthogonal frequency division multiplexing symbol-related data comprising respective symbol modulation order data, and respective symbol power data. Example operation 604 represents constructing a control plane message comprising the symbol-related data. Example operation 606 represents transmitting the control plane message from a distributed unit to a radio unit.

The control plane message can include an open-radio access network control plane section type message.

Determining the orthogonal frequency division multiplexing symbol-related data further can include determining respective symbol identifier data representing respective symbol numbers of the respective symbols within the slot.

Determining the orthogonal frequency division multiplexing symbol-related data further can include determining respective blank symbol flags indicating whether the respective symbol is blank or not blank with respect to respective physical resource block assignments for the respective symbols.

Constructing the control plane message can include arranging the symbol-related data into respective per-symbol fields, the respective per-symbol fields comprising respective symbol identifier data fields for the respective symbol identifier data, respective symbol modulation order data fields for the respective symbol modulation order data, and respective symbol power data fields for the respective symbol power data.

The control plane message further can include a number of symbols indicator representing a number of symbols contained in the slot.

The number of symbols indicator can include a first indicator value representative of a normal cyclic prefix-configured slot or a second indicator value representative of an extended cyclic prefix-configured slot.

Transmitting the control plane message from the distributed unit to the radio unit can be sent prior to transmitting user plane data to the radio unit for transmission to a user equipment, the control plane message useable by the radio unit in at least one of: radio unit power amplifier configuration, crest factor reduction operation, or digital pre-distortion tuning.

The respective symbol modulation order data can represent a highest order of modulation in use, per symbol, of the respective symbols.

The respective symbol power data can be within a range from zero decibels relative to full scale to approximately negative sixty-four decibels relative to full scale.

The respective symbol power data can be represented by respective seven-bit binary values.

Figure 7:
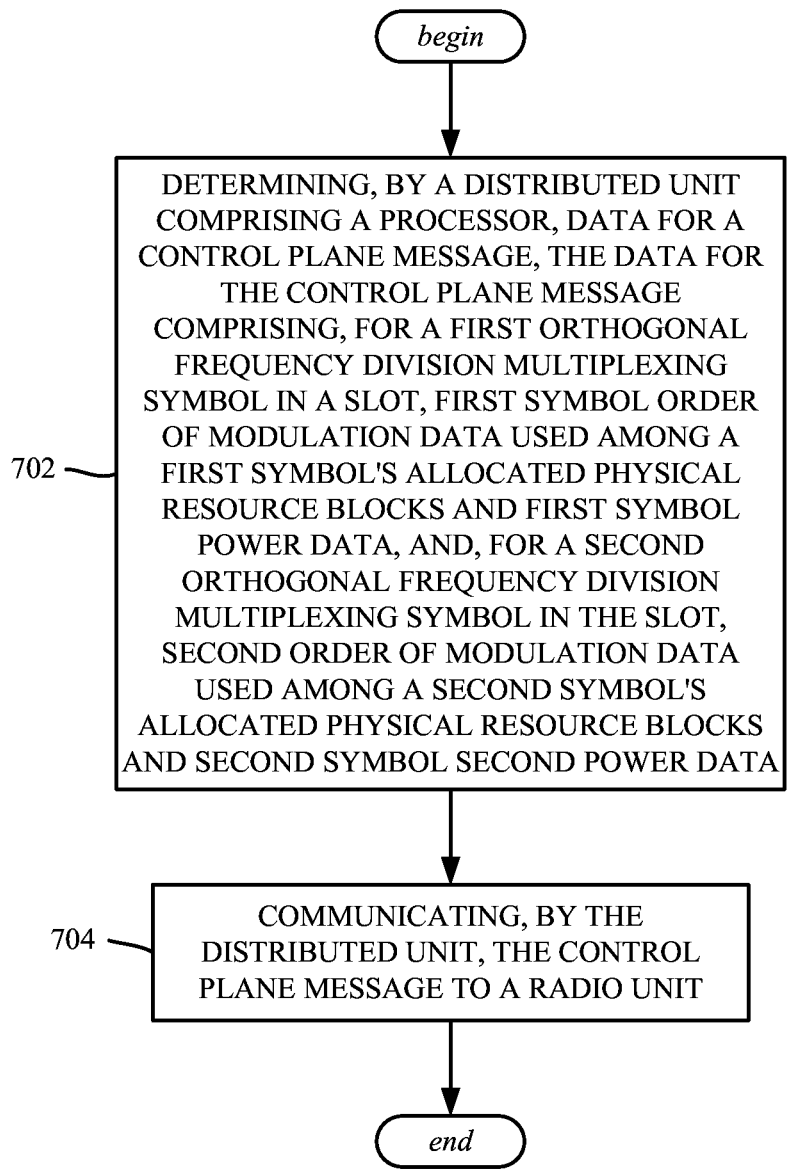
FIG. 7 is a flow diagram of example operations directed towards determining data for a communicated control plane message for orthogonal frequency division multiplexing symbols, including order of modulation data and symbol power data for two symbols, in accordance with various aspects and implementations of the subject disclosure.

One or more example aspects, such as corresponding to example operations of a method, are represented in FIG. 7. Example operation 702 represents determining, by a distributed unit comprising a processor, data for a control plane message, the data for the control plane message comprising, for a first orthogonal frequency division multiplexing symbol in a slot, first symbol order of modulation data used among a first symbol's allocated physical resource blocks and first symbol power data, and, for a second orthogonal frequency division multiplexing symbol in the slot, second order of modulation data used among a second symbol's allocated physical resource blocks and second symbol power data. Example operation 704 represents communicating, by the distributed unit, the control plane message to a radio unit.

Determining the data for the control plane message further can include determining a first blank symbol flag indicating whether the first symbol is blank with respect to the first symbol's physical resource block assignment, and determining a second blank symbol flag indicating whether the second symbol is blank with respect to the second symbol physical resource block assignment.

Further operations can include formatting, by the distributed unit, the control plane message into an open-radio access network control plane section type message; communicating the control plane message to the radio unit can include communicating the open-radio access network control plane section type message.

Communicating the control plane message to the radio unit can be sent prior to transmitting user plane data from the distributed unit to the radio unit, the control plane message useable by the radio unit in at least one of: radio unit power amplifier configuration, crest factor reduction operation, or digital pre-distortion tuning.

Determining the data for the control plane message further can include determining, for a third orthogonal frequency division multiplexing symbol in a slot, third symbol order of modulation data used among a third symbol's allocated physical resource blocks and third symbol power data.

Determining the data for the control plane message further can include indicating whether the slot has normal cyclic prefix-configured orthogonal frequency division multiplexing symbols or extended cyclic prefix-configured orthogonal frequency division multiplexing symbols.

Figure 8:
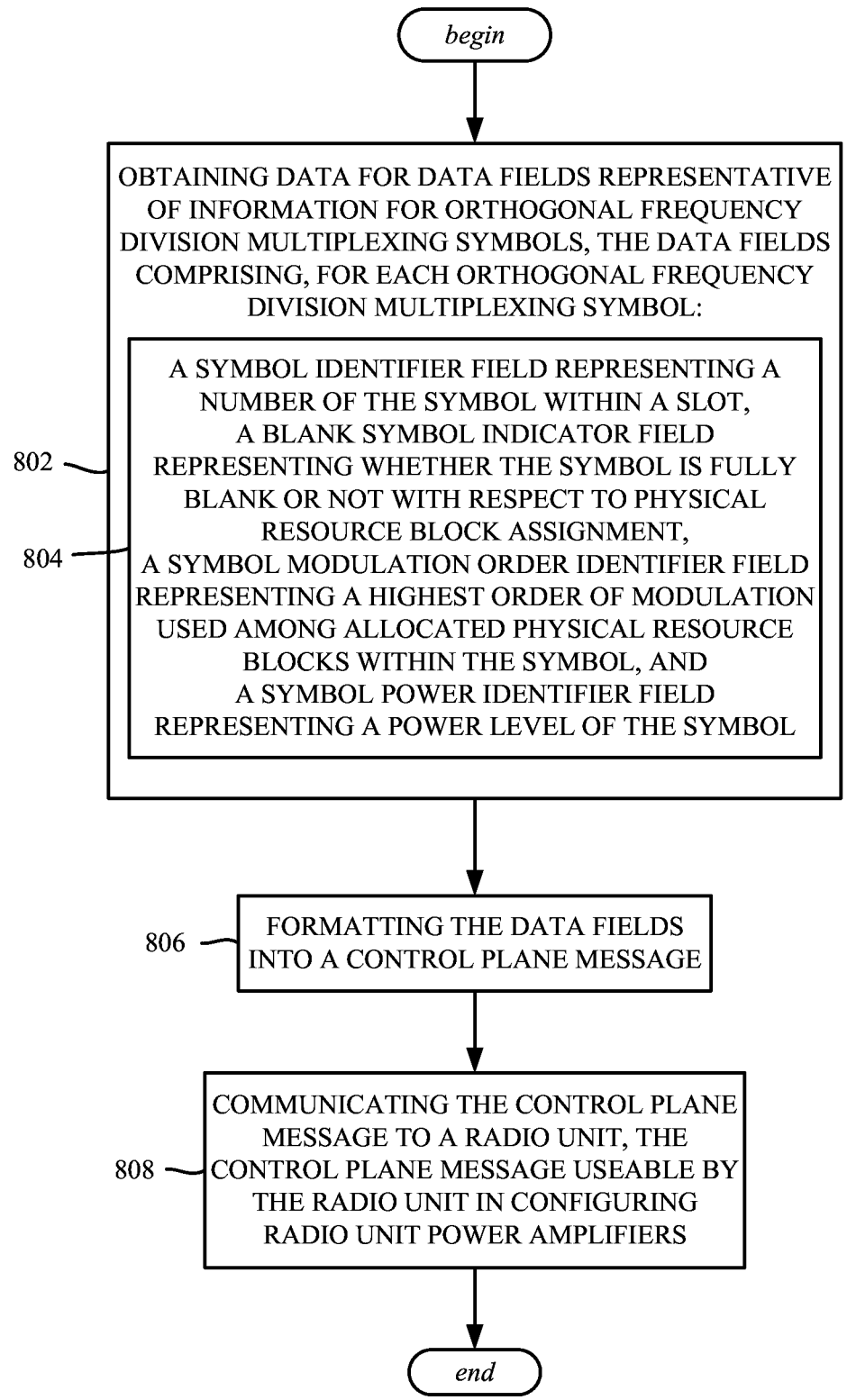
FIG. 8 is a flow diagram of example operations directed towards obtaining and communicating various symbol-related data for the symbols of a slot via a control plane message to a radio unit, in accordance with various aspects and implementations of the subject disclosure.

FIG. 8 summarizes various example operations, e.g., corresponding to a machine-readable medium, comprising executable instructions that, when executed by a processor, facilitate performance of operations. Example operation 802 represents obtaining data for data fields representative of information for orthogonal frequency division multiplexing symbols, the data fields comprising, for each orthogonal frequency division multiplexing symbol, (block 804, which represents) a symbol identifier field representing a number of the symbol within a slot, a blank symbol indicator field representing whether the symbol is fully blank or not with respect to physical resource block assignment, a symbol modulation order identifier field representing a highest order of modulation used among allocated physical resource blocks within the symbol, and a symbol power identifier field representing a power level of the symbol. Example operation 806 represents formatting the data fields into a control plane message. Example operation 808 represents communicating the control plane message to a radio unit, the control plane message useable by the radio unit in configuring radio unit power amplifiers.

Formatting the data fields into the control plane message can include indicating, in a data field, whether the slot has normal cyclic prefix-configured orthogonal frequency division multiplexing symbols or extended cyclic prefix-configured orthogonal frequency division multiplexing symbols.

Formatting the data fields into the control plane message can include formatting the control plane message as an open-radio access network control plane section type message.

As can be seen, the technology described herein facilitates communicating the downlink OFDM symbol power, blank symbol indication and highest order of modulation per symbol to a radio unit via a per-slot control plane message prepared and sent by a distributed unit. This enables and facilitates the application and implementation of more optimized energy efficiency techniques in the radio unit, because this information can be sent ahead of the actual IQ data, which gives the radio unit sufficient time to execute on required energy saving techniques. In one implementation, the control plane message is formatted according to O-RAN Alliance specifications, which does not currently have such a message.

Figure 9:
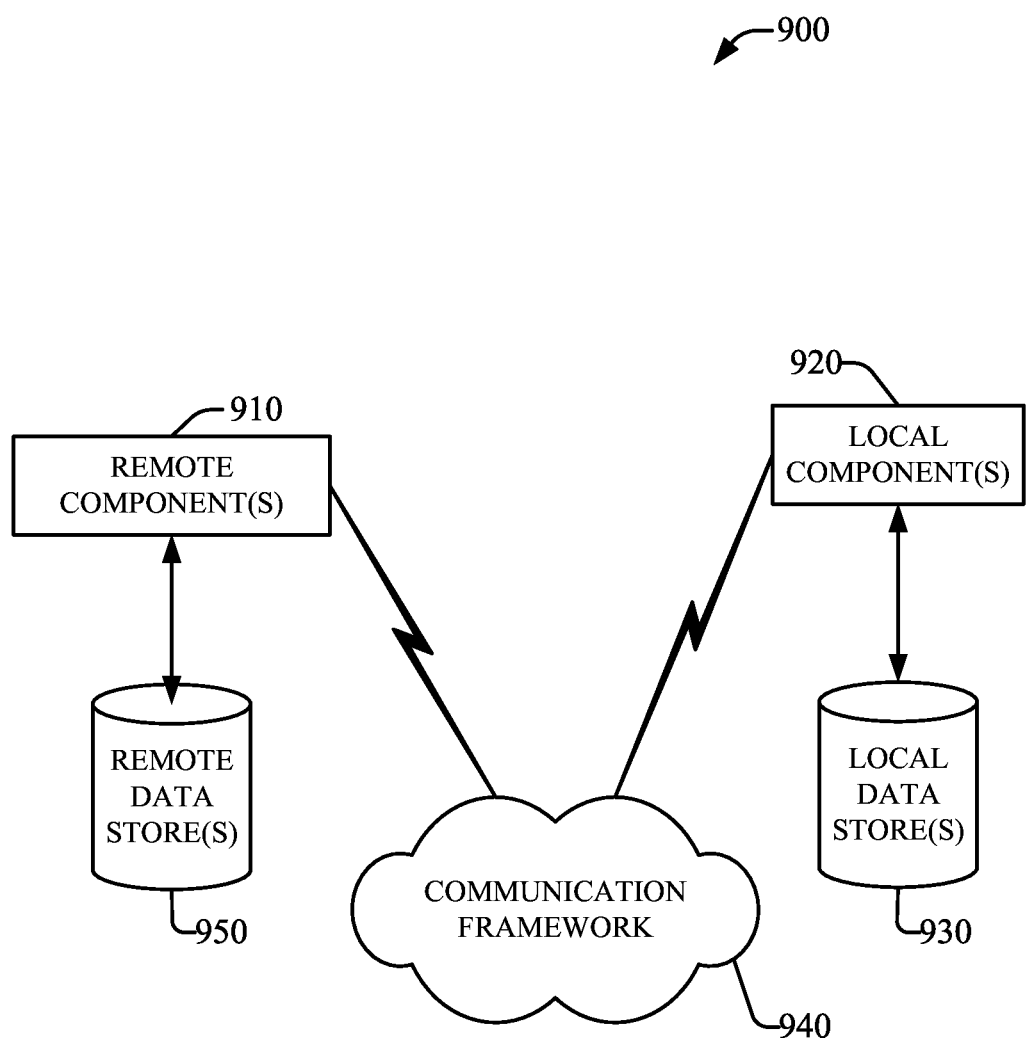
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
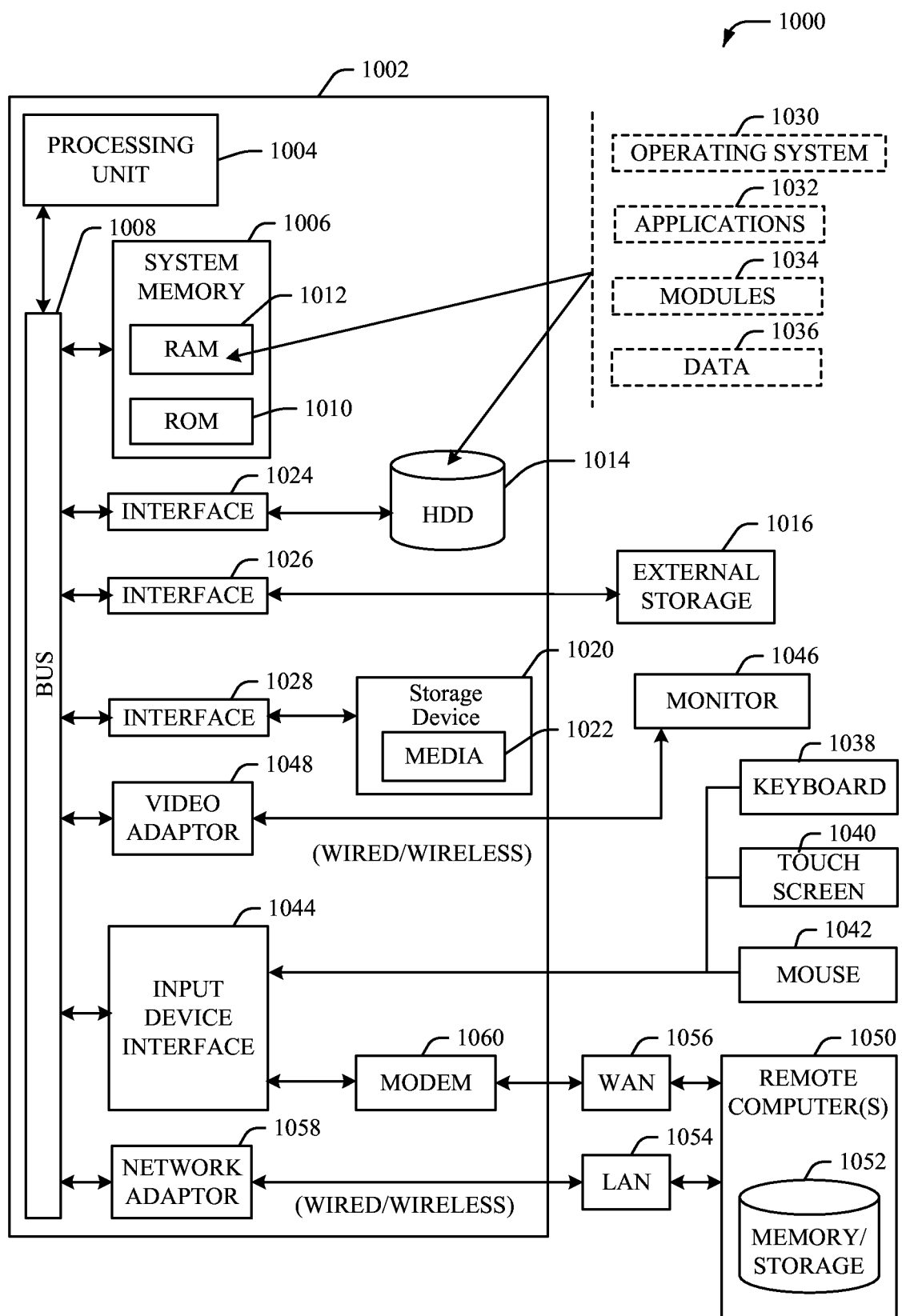
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   at least one processor; and
   at least one memory that stores executable instructions that, when executed by the at least one processor, facilitate performance of operations, the operations comprising:
   determining, based on physical resource block scheduling and symbol power allocations for a slot, orthogonal frequency division multiplexing symbol-related data for respective symbols, the orthogonal frequency division multiplexing symbol-related data comprising respective symbol modulation order data, and respective symbol power data;
   constructing a control plane message comprising the symbol-related data; and
   transmitting the control plane message from a distributed unit to a radio unit, wherein the control plane message comprises a number of symbols indicator that comprises a first indicator value representative of a normal cyclic prefix-configured slot or a second indicator value representative of an extended cyclic prefix-configured slot.

2. The network equipment of claim 1, wherein the control plane message comprises an open-radio access network control plane section type message.

3. The network equipment of claim 1, wherein the determining of the orthogonal frequency division multiplexing symbol-related data further comprises determining respective symbol identifier data representing respective symbol numbers of the respective symbols within the slot.

4. The network equipment of claim 1, wherein the determining of the orthogonal frequency division multiplexing symbol-related data further comprises determining respective blank symbol flags indicating whether the respective symbol is blank or not blank with respect to respective physical resource block assignments for the respective symbols.

5. The network equipment of claim 1, wherein the constructing of the control plane message comprises arranging the symbol-related data into respective per-symbol fields, the respective per-symbol fields comprising respective symbol identifier data fields for the respective symbol identifier data, respective symbol modulation order data fields for the respective symbol modulation order data, and respective symbol power data fields for the respective symbol power data.

6. The network equipment of claim 1, wherein the number of symbols indicator represents a number of symbols contained in the slot.

7. The network equipment of claim 1, wherein the transmitting of the control plane message from the distributed unit to the radio unit is sent prior to transmitting user plane data to the radio unit for transmission to a user equipment, the control plane message useable by the radio unit in at least one of: radio unit power amplifier configuration, crest factor reduction operation, or digital pre-distortion tuning.

8. The network equipment of claim 1, wherein the respective symbol modulation order data represents a highest order of modulation in use, per symbol, of the respective symbols.

9. The network equipment of claim 1, wherein the respective symbol power data is within a range from zero decibels relative to full scale to approximately negative sixty-four decibels relative to full scale.

10. The network equipment of claim 9, wherein the respective symbol power data is represented by respective seven-bit binary values.

11. The network equipment of claim 1, wherein the normal cyclic prefix-configured slot comprises normal cyclic prefix-configured orthogonal frequency division multiplexing symbols, and wherein the extended cyclic prefix-configured slot comprises extended cyclic prefix-configured orthogonal frequency division multiplexing symbols.

12. A method, comprising:
   determining, by a distributed unit comprising at least one processor, data for a control plane message, the data for the control plane message comprising, for a first orthogonal frequency division multiplexing symbol in a slot, first symbol order of modulation data used among first allocated physical resource blocks of the first symbol and first symbol power data of the first symbol, and, for a second orthogonal frequency division multiplexing symbol in the slot, second order of modulation data used among second allocated physical resource blocks of the second symbol and second symbol second power data of the second symbol; and communicating, by the distributed unit, the control plane message to a radio unit, wherein the control plane message further comprises a number of symbols indicator that comprises a first indicator value that represents a normal cyclic prefix-configured slot or a second indicator value that represents an extended cyclic prefix-configured slot.

13. The method of claim 12, wherein the determining of the data for the control plane message further comprises determining a first blank symbol flag indicating whether the first symbol is blank with respect to first physical resource block assignment of the first symbol, and determining a second blank symbol flag indicating whether the second symbol is blank with respect to second physical resource block assignment of the second symbol.

14. The method of claim 12, further comprising formatting, by the distributed unit, the control plane message into an open-radio access network control plane section type message, and wherein the communicating of the control plane message to the radio unit comprises communicating the open-radio access network control plane section type message.

15. The method of claim 12, wherein the communicating of the control plane message to the radio unit is sent prior to transmitting user plane data from the distributed unit to the radio unit, the control plane message useable by the radio unit in at least one of: radio unit power amplifier configuration, crest factor reduction operation, or digital pre-distortion tuning.

16. The method of claim 12, wherein the determining of the data for the control plane message further comprises determining, for a third orthogonal frequency division multiplexing symbol in a slot, third symbol order of modulation data used among third allocated physical resource blocks of the third symbol and third symbol power data of the third symbol.

17. The method of claim 12, wherein the determining of the data for the control plane message further comprises indicating whether the slot has normal cyclic prefix-configured orthogonal frequency division multiplexing symbols or extended cyclic prefix-configured orthogonal frequency division multiplexing symbols.

18. A non-transitory machine-readable medium, comprising executable instructions that, when executed by at least one processor, facilitate performance of operations, the operations comprising:
obtaining data for data fields representative of information for orthogonal frequency division multiplexing symbols, the data fields comprising, for each orthogonal frequency division multiplexing symbol,
a symbol identifier field representing a number of the symbol within a slot,
a blank symbol indicator field representing whether the symbol is fully blank or not with respect to physical resource block assignment,
a symbol modulation order identifier field representing a highest order of modulation used among allocated physical resource blocks within the symbol, and
a symbol power identifier field representing a power level of the symbol;
formatting the data fields into a control plane message; and
communicating the control plane message to a radio unit, the control plane message useable by the radio unit in configuring radio unit power amplifiers, wherein the symbol identifier field comprises a first indicator value representative of a normal cyclic prefix-configured slot or a second indicator value representative of an extended cyclic prefix-configured slot.

19. The non-transitory machine-readable medium of claim 18, wherein the formatting of the data fields into the control plane message comprises indicating, in a data field, whether the slot has normal cyclic prefix-configured orthogonal frequency division multiplexing symbols or extended cyclic prefix-configured orthogonal frequency division multiplexing symbols.

20. The non-transitory machine-readable medium of claim 18, wherein the formatting of the data fields into the control plane message comprises formatting the control plane message as an open-radio access network control plane section type message.

* * * * *